United States Patent [19]
Kofink

[11] 3,918,637
[45] *Nov. 11, 1975

[54] HEATER ASSEMBLY FOR MOTOR VEHICLE WITH WATER-COOLED COMBUSTION ENGINE

[75] Inventor: Siegfried Kofink, Zell, Germany

[73] Assignee: J. Eberspächer, Esslingen, Germany

[ * ] Notice: The portion of the term of this patent subsequent to Dec. 11, 1990, has been disclaimed.

[22] Filed: July 30, 1973

[21] Appl. No.: 384,068

Related U.S. Application Data

[63] Continuation-in-part of Ser. No. 201,352, Nov. 23, 1971, Pat. No. 3,777,975.

[30] Foreign Application Priority Data
June 26, 1972 Germany............................ 2231117

[52] U.S. Cl.................. 237/12.3 C; 415/213 A
[51] Int. Cl.$^2$............................................ B60H 1/02
[58] Field of Search............ 237/12.3 C; 415/213 A; 126/19.5, 350 A, 110 R, 110 B

[56] References Cited
UNITED STATES PATENTS

| | | | |
|---|---|---|---|
| 2,053,037 | 9/1936 | Lintern | 126/110 R |
| 2,958,293 | 11/1960 | Pray, Jr. | 415/213 A |
| 3,130,679 | 4/1964 | Sence | 415/213 A |
| 3,190,226 | 6/1965 | Judd | 415/213 A |
| 3,304,004 | 2/1967 | Hraboweckyj | 237/12.3 C |
| 3,591,079 | 7/1971 | Peters | 237/12.3 B X |
| 3,777,975 | 12/1973 | Kofink | 237/12.3 B X |

*Primary Examiner*—William E. Wayner
*Assistant Examiner*—W. E. Tapolcai, Jr.
*Attorney, Agent, or Firm*—Toren, McGeady and Stanger

[57] ABSTRACT

A heater assembly, preferably for use with motor vehicles having a water-cooled combustion engine, including blower means for propelling heater air through the assembly, burner means for providing heating gas, first heat exchange means for conducting heat between the heating gas and the heater air, second heat exchange means for conducting heat between the engine cooling water and the heater air, and a water pump for circulating the engine cooling water between the engine and the second heat exchange means. The water pump means is essentially configured as a centrifugal pump having a generally cylindrical pump housing with a centrally located water inlet and a radially extending water outlet. A drive wheel is rotatively mounted within the housing and the housing is shaped to define between said inlet and outlet a continuous water conduit free of internal constricitons extending thereacross.

4 Claims, 3 Drawing Figures 3,918,637

HEATER ASSEMBLY FOR MOTOR VEHICLE WITH WATER-COOLED COMBUSTION ENGINE

Cross reference to prior application

This is a Continuation-in-Part of Serial No. 201,352, filed November 23, 1971, now Patent 3,777,975.

BACKGROUND OF THE INVENTION

1. Field of the Invention

The present invention relates generally to a heater assemby particularly adaptable for use with motor vehicles having a water-cooled combustion engine. More specifically, the invention pertains to the structure and configuration of water pump means utilized within said assembly for circulating engine cooling water between the vehicle engine and heat exchange means for conducting heat between the heater air and the engine cooling water.

2. Description of Prior Art

It has long been known to heat the interior of motor vehicles by so-called standing heaters. Such standing heaters are usually considered accessory equipment of motor vehicles and they are used preferably in systems having air-cooled combustion engines. However, it has been increasingly found that such heaters are also installed in vehicles having water-cooled combustion engines. These additional heaters consist of a separate heating unit which is independent of the engine with additional heating air distribution means. In known arrangements of this type, the installation is usually completely independent of the engine.

While attempts have been made to preheat the engine by means of the separately generated heat of such devices, the solutions have been costly since the supply of heat to the heating air must occur through the medium of several heat exchangers. In known heaters used in connection with water-cooled combustion engines and including means for preheating the engine, a further specific disadvantage resides in the fact that the additional heater is connected in the main water circulation system of the engine by means of an additional solenoid valve. Furthermore, the feed pump, which operates to transport the preheated water to the engine, must operate continuously during normal use of the vehicle heater. Since this feed pump, which is usually an electrically driven water pump, must be permanently connected to an electrical source of supply, there results in such known arrangements the additional disadvantage of a requirement for relatively high current consumption.

It is an object of the present invention to provide a heater assembly for engine preheating wherein the feed pump, which may be an electrically driven water pump, is connected directly in the main water inflow to the water heating system of the vehicle without requiring that the pump be continuously operated during normal use of the water heater. Thus, the heater of the present invention may be arranged for engine preheating without requiring additional by-pass lines and/or solenoid valves.

SUMMARY OF THE INVENTION

Breifly, the present invention generally comprises a heater assembly particularly adaptable for use with motor vehicles having a water-cooled combustion engine. The assembly includes blower means for propelling heater air through the assembly, burner means for providing heating gas, first heat exchange means for conducting heat between the heating gas and the heater air, second heat exchange means for conducting heat between the engine cooling water and the heater air, and water pump means for circulating the engine cooling water between the engine and the second heat exchange means. The invention is particularly characterized in the configuration and arrangement of the water pump means which is essentially structured as a centrifugal pump comprising a generally cylindrical pump housing having a centrally located water inlet and a radially extending water outlet. A drive wheel is rotatively mounted within the housing and the housing is shaped to define between the water inlet and the water outlet a continuous conduit which is free of internal constrictions extending thereacross.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENT

Figure 1:
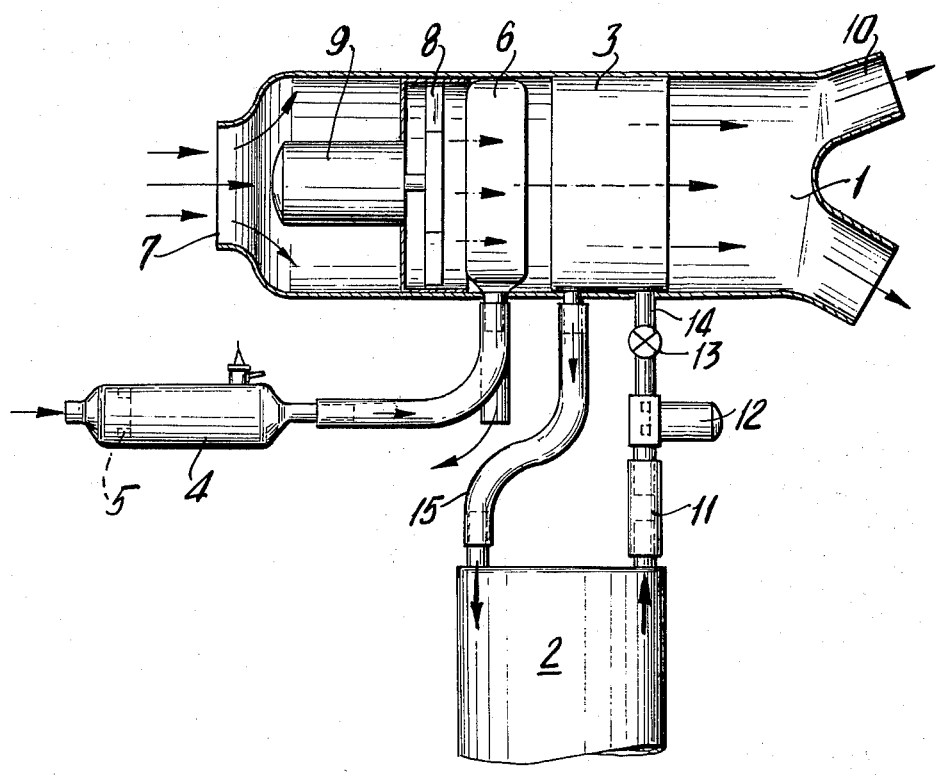
FIG. 1 is a schematic view showing the overall arrangement of the heating assembly with the water pump arrangement according to the present invention.

As shown in FIG. 1, the heater assembly of the present invention includes a housing 1, which encloses at least in part a water-air heat exchanger 3 connected to the vehicle combustion engine 2. A burner 4 including a combustion air blower 5 designed as an exhaust blower is connected to transmit heating gas to a heating gas-air heat exchanger 6 which is arranged within the heater assembly on the downstream side of the water-air heat exchanger 3. Primary air entering through the air inlet aperture 7 of the housing 1 is drawn into the assembly by a blower 8 driven by a motor 9 and is supplied to the interior of the vehicle through air inlet openings 10.

The cooling cycle of the water-cooled combustion engine 2 which drives the vehicle consists of the heating air blower 8, the water-air heat exchanger 3, and connecting lines for the water supply between the engine 2 and the heat exchanger 3. Accordingly, water serving to cool the engine 2 is supplied through a line section 11 to an electrically driven water pump 12 designed in accordance with the present invention, and through a disconnect valve 13 and a line section 14 to the heat exchanger 3. After passage through the heat exchanger 3, the engine cooling water then returns to the engine 2 through a return line 15. This known cooling cycle can be used for heating the vehicle only after the combustion engine runs and the cooling water has reached a preset temperature of, for example, 80°C, so that the hot cooling water is supplied to the heat exchanger 3. Subsequently, heating air is supplied by means of the blower 8 and conducted into the vehicle through the inlets 10.

The heat exchanger 6 is detachably arranged between the blower 8 and the heat exchanger 3. The burner 4 is arranged to provide heating gas to the inlet of the heat exchanger 6 and as the generated heating gas leaves the combustion chamber of the burner 4 at a temperature of about 1200°–1600°C, secondary air is supplied according to the invention through the apparatus to the heating gas to the extent that the temperature at the inlet of the heat exchanger 6 is about 300°–400°C. The combustion air blower 5 is arranged so that combustion air for the burner 4 is drawn through the burner 4 with the heating gas being conducted through the heat exchanger 6. Thereby the safety of the apparatus is greatly increased since, for example, despite the possibility of a leak in the heat exchanger 6, the exhaust gas of the burner 4 will not become mixed with the heating air and thus be introduced into the interior of the vehicle. Furthermore, as a result of this expedient, expensive safety devices can be eliminated thereby resulting in improved economy.

Figure 2:
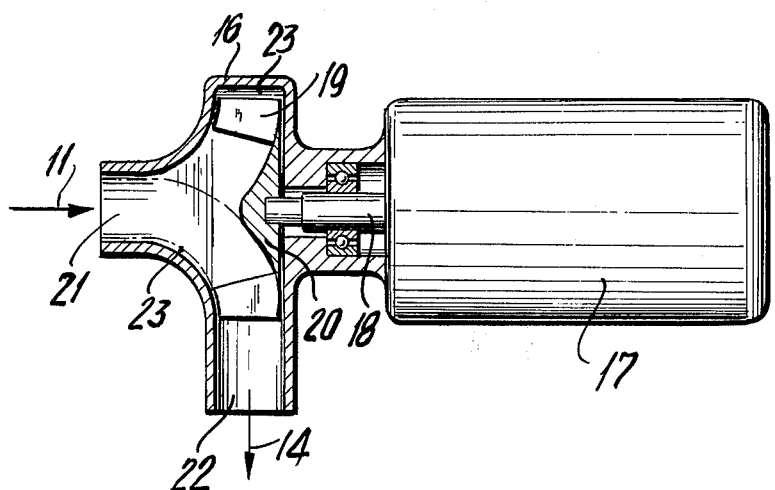
FIG. 2 is a partial sectional view illustrating the water pump of the present invention.
Figure 3:
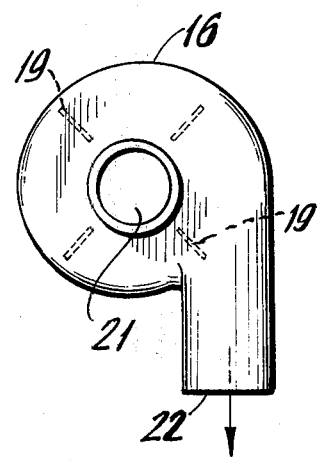
FIG. 3 is a side view of the water pump.

The water pump 12 structured and designed in accordance with the present invention is shown in greater detail in FIG. 2. A pump housing 16 defining an internal annular space 23 has arranged therein a feed wheel 19 mounted on a hub 20. An electric motor 17 provides power to drive the wheel 19 through a shaft 18 connected therebetween. The pump 12 is arranged within the water cycle between the lines 11 and 14. The medium to be conveyed, i.e. water, enters the pump 12 at a pump inlet 21 and flows therethrough within the annular space 23. Annular space 23 is designed to widen in the shape of a funnel from the pump inlet 21 and to conduct water to a pump outlet 22.

When the feed wheel 19 is not rotatively propelled by the electric motor 17, the interior of the pump housing 16 operates as a conduit shaped as a simple bend having no constrictions or other similar impediments extending across the flow path of the water flowing therethrough. However, when for the purposes of starting the heating unit, the feed wheel 19 is brought into operation and rotatively driven by the electric motor 7 through the shaft 18, it operates to convey water from the line 11 into line 14. The fact that with this arrangement the efficiency of the pump is relatively low will be found to be of no importance since the special advantage of the arrangement set forth resides in the fact that during the time in which the heating unit operates, the pump acts merely as a bend in the flow path of the water and the electric motor 17 may be switched off. Moreover, due to the fact that no solenoid valves are necessary to effect connection or disconnection of the pump in the water cycle, and also because all by-pass lines for the arrangement of the pump are eliminated, there results a device having the advantage of improved economy enabled by the pump design of the present invention.

From the foregoing it will be seen that the heater assembly of the present invention is particularly characterized by inclusion of a water pump which is designed as a centrifugal pump having a feed or drive wheel 19 rotatively mounted within the housing 16. The pump is of a radial construction and the pump housing defines a central inlet 21 and a radially extending outlet 22 with no cross-sectional constrictions or impediments therebetween. The design of the pump is considered particularly advantageous because the pump housing is shaped to define the pump inlet in the region of the inflow to the feed wheel as a funnel shape widening in cross-sectional area. As a result of the arrangement of the present invention, there may be achieved cross-sectional flow areas through the water pump which are so dimensioned that the pressure loss through the pump is not greater than that which would result in a conduit having a simple bend in the flow path thus defined. This in turn gives rise to a further advantage in that the feed pump may be connected directly in the main warm water inflow to the heater assembly without necessitating continuous operation of the pump during normal operation of the heating unit.

A further improvement may be achieved according to the present invention due to the fact that the feed or drive wheel 19 may be designed to include at least three and possibly four vanes or blades, as shown in FIG. 2. As a result, when the drive wheel 19 is stationary, the pump housing acts as a water conduit comprising merely a simple bend.

While specific embodiments of the invention have been shown and described in detail to illustrate the application of the inventive principles, it will be understood that the invention may be embodied otherwise without departing from such principles.

What is claimed is:

1. A heater assembly for a motor vehicle haivng a water-cooled combustion engine comprising, in combination, a housing defining therethrough a flow path for heater air, blower means for propelling heater air through said housing, burner means for providing heating gas, first heat exchange means located within said housing in the path of said heater air and having delivered thereto said heating gas from said burner means for conducting heat between said heating gas and said heater air, second heat exchange means located within said housing in the path of said heater air downstream of said first heat exchange means for conducting heat between said engine cooling water and said heater air, conduit means for conducting cooling water between said engine and said second heat exchange means, water pump means located within said conduit means and defining a portion thereof for circulating said engine cooling water between said engine and said second heat exchange means, said water pump means being essentially configured as a centrifugal pump comprising a generally cylindrical pump housing having a centrally located water inlet and a radially extending water outlet, and a drive wheel rotatably mounted within said pump housing, said pump housing being shaped to define between said water inlet and said water outlet a continuous portion of said conduit means free of internal constrictions extending thereacross.

2. An assembly according to claim 1 wherein said pump housing is configured to define said water conduit in the shape of a funnel widening from said pump inlet to said drive wheel.

3. An assembly according to claim 1 wherein said drive wheel comprises at least three blades for propelling water through said pump when said drive wheel is rotatively propelled.

4. An assembly according to claim 1 wherein said pump housing defines an internal annular space arranged as a portion of said continuous conduit between said water inlet and said water outlet, said annular space being greater in cross-sectional area than both said inlet and said outlet.

* * * * *